June 8, 1965 R. H. KEMNITZ 3,188,155
ALIGNMENT INDICATING ROLLER TYPE SUPPORT ASSEMBLY
Filed Jan. 24, 1963

Inventor
Robert H. Kemnitz
By Arthur M. Steinl
Attorney

United States Patent Office

3,188,155
Patented June 8, 1965

3,188,155
ALIGNMENT INDICATING ROLLER TYPE
SUPPORT ASSEMBLY
Robert H. Kemnitz, Milwaukee, Wis., assignor to Allis-Chalmers Manufacturing Company, Milwaukee, Wis.
Filed Jan. 24, 1963, Ser. No. 253,641
5 Claims. (Cl. 308—204)

This invention relates to an apparatus for determining proper alignment of a carrying roller, particularly a carrying roller utilized for supporting a large rotary apparatus such as a rotary kiln.

A large rotary apparatus such as a rotary kiln rotates about its longitudinal axis and is usually supported for such rotation by carrying rollers in contact with riding rings surrounding the rotary kiln at various points along the length of the kiln. Since the cost of replacing the riding rings or the carrying rollers, or both, is relatively high, one of the important considerations in the operation of a rotary kiln is the maintenance of proper alignment between the surface of the carrying roller and the riding ring to prevent uneven wearing of the surfaces. If the two are kept in proper alignment a long life can be expected from both the riding ring and bearing roller.

In order to accomplish this alignment, it has heretofore been necessary to periodically, at rather short intervals, check the alignment by visual inspection or by indicating means showing the total downward thrust along the slope of the rotary kiln and therefrom calculating the alignment relationship of the carrying rollers to the riding rings. The visual method is usually inadequate because the checks must be made relatively often, is difficult, inconvenient and in most instances it is not dependably carried out by the operator of the kiln. The second method according to the prior art, determining the thrust along the rotary kiln, determines the relationship between all the carrying rollers supporting the rotary kiln but still necessitates an individual inspection of the carrying rollers to determine which of the rollers are not in proper alignment. Also, if two rollers should be in opposing misalignment they would balance each other and the thrust indicators would not show the change in thrust along the axis of the kiln.

This invention accomplishes the determination of the alignment of each individual carrying roller supporting a rotary kiln or similar apparatus and does so easily and with sufficient accuracy so that its utilization greatly increases the life of the riding rings and carrying rollers.

An object of this invention is to provide a carrying roller alignment indicator that is easily readable and accurate.

Another object of this invention is to provide a carrying roller alignment indicator that enables rapid and simple alignment by referring to simple reference readings on an indicator.

Other objects and advantages of this invention will be apparent from the following detailed description.

Figures 1, 2:
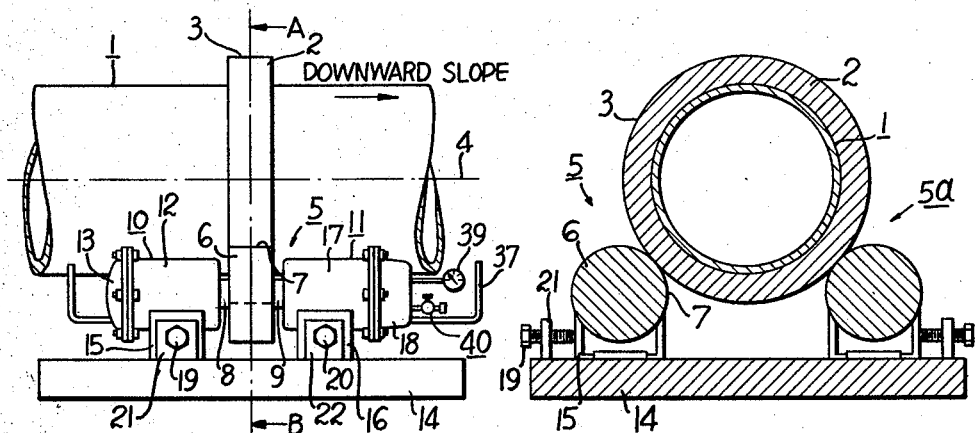
FIG. 1 is a partial side view of a rotary kiln supported by a carrying roller mechanism showing the external embodiments of this invention.
FIG. 2 is a cross sectional end view of a rotary kiln taken along line A-B of FIG. 1 showing the carrying roller mechanism relationships on each side of the rotary kiln.

Referring to FIG. 1, an inclined rotary kiln 1 having a riding ring 2 with an outer bearing surface 3 parallel to the longitudinal axis 4 of the rotary kiln is supported by a carrying roller mechanism 5. The mechanism 5 has a cylindrical carrying roller 6 with a bearing surface 7 in contact with riding ring 2. The roller 6 has two carrying shaft extensions providing an upward roller shaft 8 and a downward roller shaft 9, and an upward bearing housing structure 10 and downward bearing housing structure 11, enclosing their respective roller shafts 8 and 9.

The bearing housing structure 10, extending in the direction of upward kiln inclination, consists of a bearing housing 12, housing bonnet 13 and a support 15 mounted on a base 14 for supporting roller shaft 8.

The bearing housing structure 11 extending in the direction of downward kiln inclination is similarly supported from base structure 14 by a housing support 16, bearing housing 17 and bonnet 18. Bearing housing structure 10 and bearing housing 11 are movable along base structure 14 perpendicular to the longitudinal axis 4 of the rotary kiln by the utilization of an adjusting means such as adjusting lugs 19, 20 which are connected to the base structure 14 through adjuster supports 21 and 22.

Referring to FIG. 2, it is seen that carrying roller mechanism 5 shown in FIG. 1 is duplicated on the other side of the rotary kiln by a similarly located second carrying roller mechanism 5a.

Figure 3:
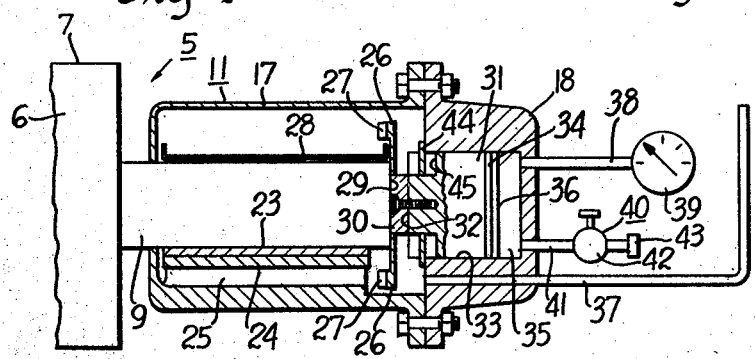
FIG. 3 is a partial cross sectional side view of the portion of FIG. 1 embodying this invention.

Referring to FIG. 3, a cross section of downward bearing housing structure 11 shows bearing housing 17 and housing bonnet 18 beforementioned with regard in FIG. 1. A bearing surface 23 is also here shown and is supported by a bearing supporting structure 24 in such manner to provide a lubricating oil reservoir 25. Oil ladle arms 26 are attached to the end of the shaft 9 and carry oil ladles 27 for scooping the oil from reservoir 25 and distributing it into an oil pan 28 located over shaft 9. A wearing plate 30 may be provided axially adjacent to the end of shaft 9 that makes contact with end surface 29 of shaft 9. The wearing plate 30, however, is attached to a surface 32 on a piston 31. The piston 31 is keyed within an end chamber 33 axially contiguous with the shaft 9, by a keying plate 44 attached to housing bonnet 18 so that piston 31 is not rotatable but is movable within the limits of a keying slot 45 in piston 31 in a direction along the axis of the shaft 9. An O ring 34 seals piston 31 in chamber 33. Piston 31 has an end surface 36 that encloses a pressure chamber 35 within chamber 33. An oil pipe 37 extends from the bottom of the oil reservoir 25 to the atmosphere. From the pressure chamber 35 a pressure pipe 38 communicates with a pressure gauge 39. Also attached to and in communication with the pressure chamber 35 is a pressure loading structure 40 consisting of a pipe 41, a pressure loading valve 42, and a coupler 43 for attaching structure 40 to a source of pressure (not shown).

In the operation of this invention the rotary kiln 1, shown in FIGS. 1 and 2, rotates about its longitudinal axis and is supported by riding ring 2 at its riding ring bearing surface 3 upon carrying roller mechanisms 5 and 5a. The alignment of either carrying mechanism is accomplished in the same manner.

The rotary kiln as it is rotating causes carrying roller 6 to rotate in contact with riding ring 2 and the weight of the kiln is carried by its carrying roller to its shaft extensions 8, 9. For the most efficient operation and proper wearing of the surfaces riding ring bearing surface 3 should meet and be parallel with carrying roller bearing surface 7 so that both surfaces will wear evenly and remain parallel to each other.

Pressure chamber 35 is charged with fluid under pressure, preferably oil, through connecting structure 40. The pressure established within the pressure chamber is a predetermined amount for a particular operating condition. For example, when the carrying roller is in a sloping position as shown in FIG. 1, the pressure would be selected so that the force of carrying roller 6 pushing downward is balanced by the pressure exerted against piston 31 in pressure chamber 35. In this situation, a reference point can be noted or marked on pressure gauge 39. When carrying roller bearing surface 7 is not parallel to riding ring bearing surface 3 a force will be exerted, as shown by an arrow in FIGS. 4 and 5, upon carrying roller 6 because of the angular conjunction of the riding ring bearing surface and the carrying roller bearing surface. Then, if misalignment occurs a lateral force upon the carrying roller will be created in a direction as shown by the arrow either in FIG. 4 or FIG. 5, depending upon the nature of the misalignment as illustrated in these two figures.

Figures 4, 5:
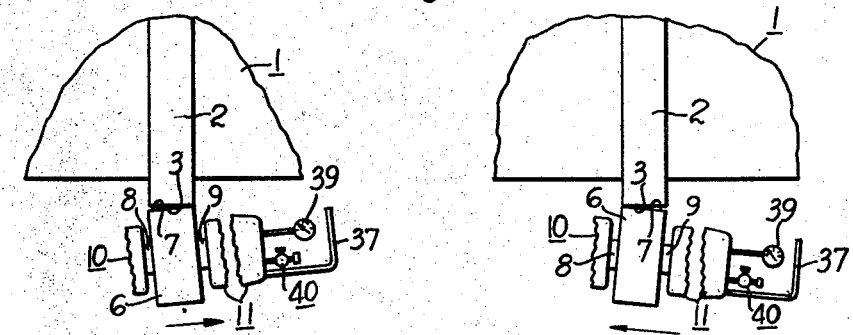
FIG. 4 is an exaggerated, simplified showing of the carrying roller and riding ring when the two are not in alignment in one direction.
FIG. 5 is similar to FIG. 4 and shows a misalignment in the opposite direction.

If the misalignment is as shown in FIG. 4 then the pressure in chamber 35 will be communicated to the pressure gauge 39 and will indicate the reading higher than the previously noted reference pressure. The proper alignment may then be accomplished by moving bearing housing 10 inwardly along the base 14 by turning adjusting lug 19. This would preferably be accomplished in predetermined increments, such as .004" until the pressure reading upon the pressure gauge is again the previously noted or marked reference pressure.

When the misalignment occurs as shown in FIG. 5, that is, with the force on the carrying roller being in the direction of the elevated end of the kiln as shown by the arrow, the pressure as shown on gauge 39 will not drop below the reference pressure but rather will remain about the same and therefore require a different technique to detect and remedy this type of misalignment. To determine possible misalignment under these conditions and remedy such a condition, lug 20 is turned to move bearing housing 11 inwardly until a pressure increase is indicated on the pressure gauge and then backing off lug 20 one increment to bring the pressure back to the reference pressure. In this manner the alignment is assured. Also, it is possible to determine whether the carrying roller is thrusting upwardly as indicated by the arrow in FIG. 5 by using a hammer or other device to tap on housing bonnet 13 to determine whether the shaft 8 is pressing against the bonnet. If the carrying roller is thrusting upward, the solid sound of the striking of the hammer will indicate this, and if it is not a hollow sound will be heard. Either one of these two techniques may be utilized.

This invention has the particular advantage with respect to the ease of a kiln operator may check to determine possible misalignment and remedy any such conditions.

It is readily seen that the utilization of this invention in the rotary kiln is but one example of a possible use. For rotary apparatus other than a rotary kiln 1, which may not be operated at a slope, the invention will still provide the same advantages. This is readily seen since the thrust against one bonnet (not having a pressure gauge on it) can be determined with a hammer and the thrust on the other bonnet from the shaft extension may be determined by reading of the pressure gauge. This would apply whether the rotary apparatus was in a horizontal or inclined position.

From the foregoing it will be understood that the present invention is possessed of unique advantages. However, such modifications and equivalents of the disclosed concepts such as readily occur to those skilled in the art are intended to be included within the scope of this invention and thus the scope of this invention is intended to be limited only by the scope of the claims such as are, or may hereafter be, appended hereto.

Having now particularly described and ascertained the nature of my said invention and the manner in which it is to be performed, I declare that what I clam is:

1. An alignment indicating roller type support assembly for carrying rotatable structures comprising a base structure, a housing structure movably supported on said base, a roller with a shaft projecting axially thereof and journaled in said housing, said housing structure enclosing the end of said shaft to define a fluid pressure confining chamber of predetermined volume in axial alignment with the shaft; a pressure gauge mounted on said housing and in communication with the chamber, adjusting means for moving the housing structure relative to said shaft journaled therein and to said base structure to thereby change said volume of said chamber and change the pressure of fluid contained within said chamber and registered on said gauge.

2. In an assembly according to claim 1, a piston disposed within said chamber and in axial alignment with said shaft, said piston defining said pressure chamber between a surface of the piston and the housing structure, said piston being limitedly movable to abut the adjacent end of the shaft and move therewith in a direction along the axis of the roller.

3. In an assembly according to claim 1, a pressure loading structure in communication with the pressure chamber for establishing a predetermined reference pressure within said chamber.

4. An apparatus comprising, a base structure, a rotatable structure, and a roller supporting mechanism mounted on said base supporting said rotatable structure for rotation about an axis inclined relative to said base, said roller mechanism comprising a roller with two shaft extensions projecting therefrom along the axis of the roller, a bearing structure for each shaft extension supported by the base to carry the roller substantially parallel to the inclined axis of the rotatable structure, a housing structure enclosing each shaft extension and bearing, the housing enclosing the vertically lower of the two shaft extensions defining an end chamber in axial alignment therewith; a piston disposed within the end chamber axially abutting the shaft extension and defining within said end chamber a fluid pressure chamber of predetermined volume, a pressure gauge and pressure loading connecting structure both in communication with the pressure chamber, and adjusting means for moving the housing structure relative to said shaft journaled therein and to the base structure to thereby change said volume of said fluid pressure chamber and change the pressure of fluid contained within said chamber and registered on said gauge.

5. A method for maintaining parallel alignment between the axis of a roller supporting mechanism and a rotatable structure carried thereby comprising, applying a fluid to an end face of a shaft supporting the roller, pressurizing said fluid to a pressure greater than atmosphere pressure, determining the pressure of said fluid at a time that the alignment is observed to be parallel thereby establishing a reference pressure, thereafter at desired time intervals, determining the pressure of said fluid and noting deviation from said reference pressure, followed by angularly displacing said roller to restore said fluid to said reference pressure.

References Cited by the Examiner

UNITED STATES PATENTS

| | | | |
|---|---|---|---|
| 2,336,417 | 12/43 | Petersen | 308—203 |
| 2,521,731 | 9/50 | Kennedy | 308—203 |
| 2,551,774 | 5/51 | Traylor | 308—203 |
| 2,746,418 | 5/56 | Loss | 116—124 |

ROBERT C. RIORDON, *Primary Examiner.*